United States Patent [19]
Koffler et al.

[11] Patent Number: 4,829,707
[45] Date of Patent: May 16, 1989

[54] PLANT PROTECTOR

[76] Inventors: Nickodemus J. Koffler, Box 460, New England, N. Dak. 58647; Ronald J. Schoch, 662 - 21st St. West, Dickinson, N. Dak. 58601

[21] Appl. No.: 108,643

[22] Filed: Oct. 15, 1987

Related U.S. Application Data

[63] Continuation-in-part of Ser. No. 886,050, Jul. 16, 1986, abandoned.

[51] Int. Cl.⁴ ............................................. A01G 13/02
[52] U.S. Cl. ....................................... 47/28 R; 47/29
[58] Field of Search .................. 47/26, 28, 29, 30, 31, 47/27, 84, 32; 206/423, 491, 492

[56] References Cited

U.S. PATENT DOCUMENTS

| 333,810 | 1/1886 | Bailey | 47/28 |
| 436,183 | 9/1890 | Moore et al. | 47/29 |
| 778,688 | 12/1904 | Marsh | 47/28 |
| 1,021,447 | 3/1912 | Carstens | 47/28 |
| 1,074,828 | 10/1913 | Bigelow | 47/31 |
| 2,160,998 | 6/1939 | Wilson | 47/84 |
| 2,753,662 | 7/1956 | Behnke | 47/29 |
| 3,266,188 | 8/1966 | Budd | 47/28 |
| 3,352,058 | 11/1967 | Brant | 47/29 |
| 4,118,890 | 10/1978 | Shore | 206/423 |
| 4,569,153 | 2/1986 | Szilagyi | 47/29 |
| 4,612,725 | 9/1986 | Driver | 47/58 |

FOREIGN PATENT DOCUMENTS

| 8502170 | 3/1987 | Netherlands | 47/29 |
| 7424 | of 1907 | United Kingdom | 47/30 |

Primary Examiner—Danton D. DeMille
Attorney, Agent, or Firm—Orrin M. Haugen; Thomas J. Nikolai; Frederick W. Niebuhr

[57] ABSTRACT

This invention relates to covers for plants used to protect the plants from meteorological elements, insects, birds and other small animals. More particularly, it relates to a plant protector for protecting young bushes, shrubs, vegetable plants or flowers from wind, rain, snow, frost and sudden temperature changes as well as from infestation by bugs, rabbits and birds which can damage young plants. The invention also promotes growth in that it extends the length of the growing season.

2 Claims, 2 Drawing Sheets

U.S. Patent  May 16, 1989  Sheet 1 of 2  4,829,707
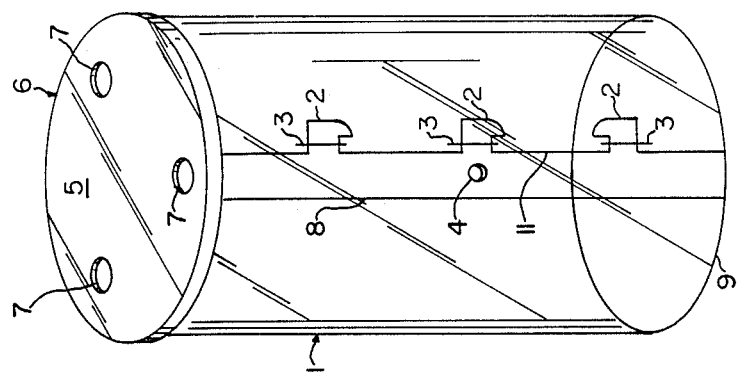
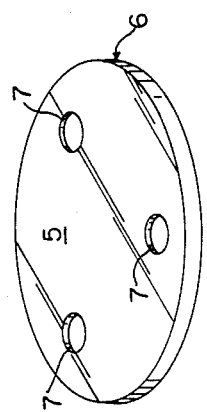
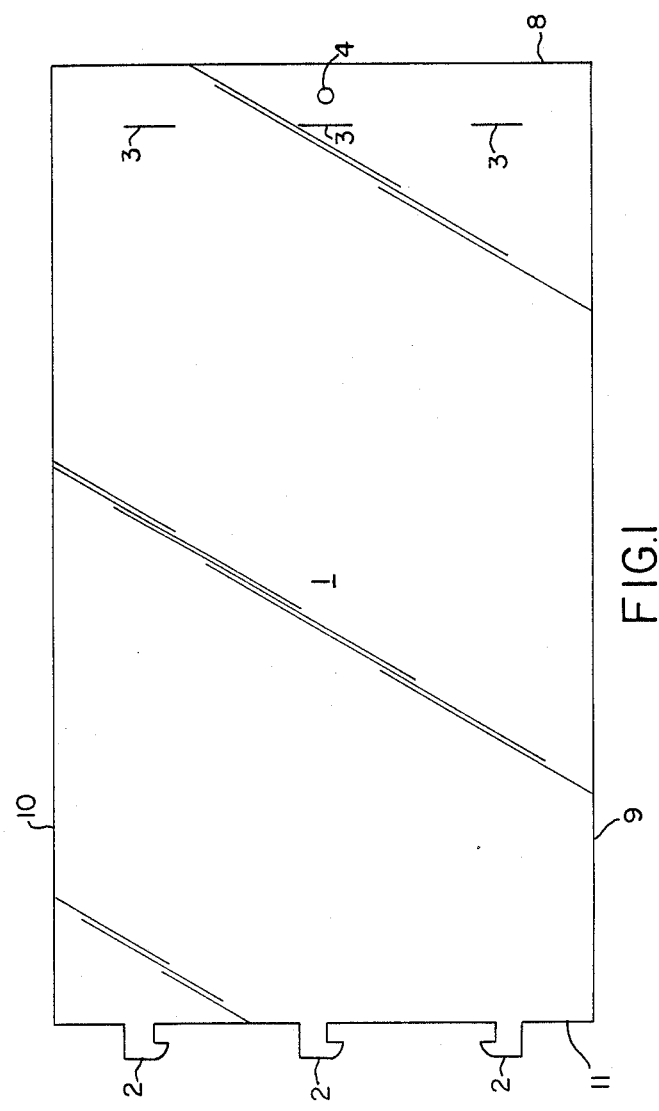

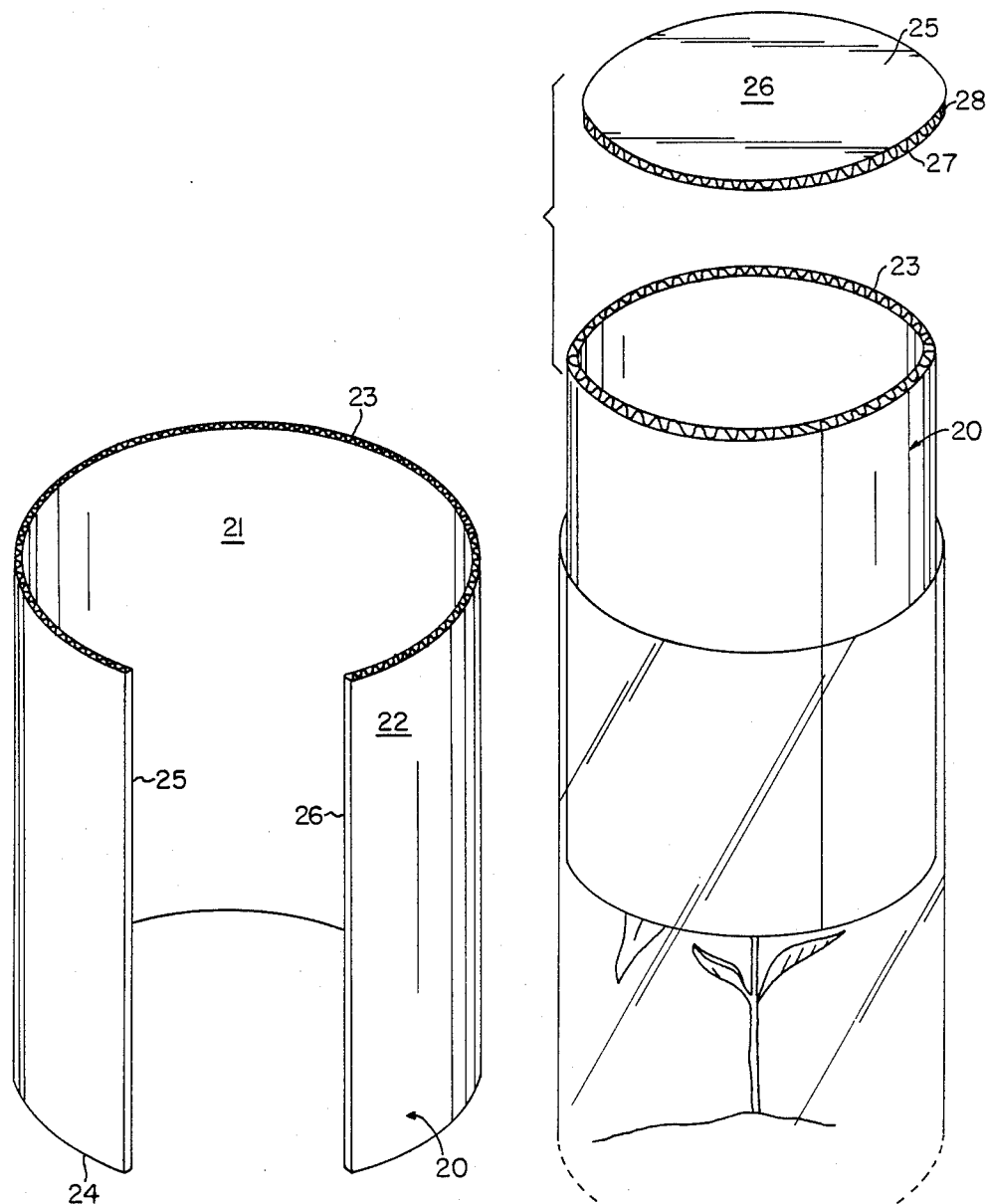

PLANT PROTECTOR

CROSS-REFERENCE TO RELATED APPLICATION

This is a continuation-in-part of application Ser. No. 886,050, filed July 16, 1986, now abandoned.

BACKGROUND OF THE INVENTION

Plant protectors have been employed for a long period of time by gardeners and farmers. Gardeners have used tin cans and, more recently, opaque white plastic milk bottles as plant protectors. These, however, preclude the plant from receiving enough sunlight to grow heartily.

Others have attempted to shield and protect plants from the elements, insects, birds and animals by employing protection contraptions made out of glass or other translucent materials. Such protectors, however, have proven to be less convenient, less desirable and less effective than the present invention.

Examples of prior art plant protectors are disclosed in U.S. Pat. No. 3,214,865 issued to Rosenvold et al on Nov. 2, 1965; U.S. Pat. No. 3,384,992 issued to Heffron on May 28, 1968; U.S. Pat. No. 1,641,244 issued to Woodruff on Sept. 6, 1927; U.S. Pat. No. 327,510 issued to Anderson on Oct. 6, 1885; and U.S. Pat. No. 303,543 issued to Prentiss on Aug. 12, 1884. The desirability and advantages of the present invention vis-a-vis these earlier patents will become more apparent from the following description of the present invention.

SUMMARY OF THE INVENTION

The present invention is comprised of a relatively thin, opaque rectangular shaped piece of plastic which includes a plurality of slits cut through it along a line extending approximately one inch from one of the edges of the plastic and a series of corresponding tabs extending outwardly from the opposite edge which is used to create a cylindrical base. The invention also includes a circular cap having a diameter which is the same as the cylinder formed by inserting the tabs of the plastic sheet into the slits. This cap has a plurality of holes for transmission of the air into and out of the protector. Further, the invention includes a rectangular shaped insulative member which is preferably made of a corrugated paper product such as cardboard. The insulative member is preferably constructed so that it can be formed into a cylinder and slid within the plastic cylindrical base. The insulative member will most typically be used with the remainder of the device only when frost advisories or warnings have been issued.

Through experimentation and analysis, it has been determined by the inventor that a plant protector having a green polypropylene base and cover is more effective than one having a white polyethylene base and cover. By making the parts out of a transparent green polypropylene, those portions of the light spectrum which are involved in photosynthesis are transmitted through the plastic to the plant while other potentially harmful portions of light spectrum are blocked out. The white polypropylene, on the other hand, is so opaque that too much light is filtered out. Correct color and material choice is an important factor for promoting effective growth. Similarly, polypropylenes treated with an ultraviolet inhibitor have been found to be acceptable materials to prevent burning of the plants.

OBJECTS

A primary object of the present invention is to provide a plant protector which is effective for preventing damage to plants resulting from the weather, insects, small animals and birds.

A second object of the invention is to provide such a plant protector which can easily be assembled for use.

A third object of the invention is to provide a plant protector which can be easily disassembled and stored in a manner which does not take up a great deal of space when the plant protector is not in use.

A fourth object of the invention is to provide such a plant protector which will permit the maximum amount of light from the appropriate portion of the spectrum to gain access to the plant during as much of the day as possible.

A fifth object of the invention is to provide a plant protector which can filter out some portions of the light spectrum which do not help and, may in fact, harm young plants.

A sixth object of the invention is to provide a plant protector which meets all of the foregoing objects and also includes a removable insulative member for preventing damage to the plant caused by frost.

Still further and additional objects and advantages of the invention will become more clear from a reading of the detailed description of the preferred embodiment in conjunction with the associated patent drawings and the claims.

IN THE DRAWINGS

FIG. 1 shows the base portion of the protector shown in an unassembled manner;

FIG. 2 is a perspective view showing the top of the plant protector of the present invention; and FIG. 3 is a perspective view showing the plant protector as it appears when fully assembled.

FIG. 4 is a perspective view showing the insulative member of the present invention.

FIG. 5 is a perspective view showing how the insulative member is inserted within or removed from the base as desired.

DESCRIPTION OF THE PREFRRED EMBODIMENT

FIG. 1 shows the various elements of the base 1 of the preferred embodiment. Base 1 is generally cut from a single sheet of transparent plastic tinted material. A transparent polypropylene a transparent polypropylene material colored green is deemed to be most effective than a white opaque polyethylene in connection with more plants likely to be grown in a vegetable garden. However, those of ordinary skill in the art will recognize that other colors could be adopted in order to promote the transmission through the plastic of different portions of the spectrum while other portions of the spectrum are filtered in order to promote photosynthesis and growth of plants having differing light requirements. For example, making the base of a polypropylene treated with an ultraviolet inhibitor has proven to be acceptable.

As cut from the sheet of plastic, the base is generally rectangular having four sides 8, 9, 10 and 11, along a line spaced approximately one to two inches from side 8 are a plurality of slits 3 cut into the plastic. Each slit 3 has a length of approximately one inch. In the preferred embodiment, one of the slits 3 is centered between sides 9 and 10 along the line; while two other slits 3 are placed along the line approximately two inches from sides 9 and 10 of the rectangle respectively. The slits 3 also generally run parallel to side 8. The location of the slits 3, while variable, should be chosen so that they do not cause the plastic sheet to be easily ripped or torn.

Also spaced an equal distance between sides 9 and 10 of the rectangle is a hole 4 having approximately a half-inch diameter. In the preferred embodiment, this hole 4 is spaced an equal distance between the center slot 3 and side 8 of the rectangle. When it is desirable to store the base 1, a hook (not shown) can be placed through this hole 4 so that the bases 1 can be hung from the hook in a workshop area or garage.

Associated with each of the slits 3 and extending from side 11 of the base 1 is a hook-shaped member 2. As shown in FIG. 3, when it is desirable to use the protector, it is formed into a cylinder and this shape is maintained by pushing each of the hooks 2 through its associate slot 3. The shape of the hooks prevent the edges or sides 8 and 11 of the base from becoming disassociated from each other.

The plant protector of the present invention also includes a lid 5 having a diameter approximately equal to the diameter of the cylinder formed by the plastic base 1. In the preferred embodiment, this lid 5 is also made of a transparent plastic either of the same color or a different color than the base. The lid 5 has a circular top and rim 6 extending downwardly therefrom at approximately a right angle. The top also has a plurality of holes 7 which promote the transmission of air and moisture between the inside and outside of the protector. This, of course, is vital if the plant is to effectively perform photosynthesis and grow. When in use, the top 5 is placed over one edge 10 of the base 1 which has already been formed into a cylinder. The rim 6 acts in conjunction with the plastic material of the base 1 near edge 10 to form a relatively tight fit so that the base 1 and top 5 will not become disassociated from each other unless desired. The holes 7 permit rainwater to get into the plant protector. The cover also retains moisture to achieve relatively high humidity levels within the plant protector. This, of course, encourages improved plant growth.

When assembled as described above and as shown in FIG. 3, the plant protector can be placed over a plant or small seedling and pushed down slightly into the ground so that it will not tip over by the wind or small animals. The plant is then permitted to grow inside until reaches the point where it no longer needs to be protected to the same extent as it was when it first sprouted.

During certain times of the typical growing season of most geographic areas, climatic conditions are such that plant damaging frost can be a problem. While the base 1 in combination with the lid 5 provide some insulation beneficial to the plant growing inside, on particularly cool nights it may desirable to increase the amount of insulative protection by also using insulative member 20.

As best shown in FIG. 4, insulative member 20 has an inside surface 21 and outside surface 22, a top edge 23, a bottom edge 24, and two side edges 25 and 26. Member 20 is designed to lay flat for storage when not in use.

When the need arises for the insulative member 20, edges 25 and 26 are drawn together to form a cylinder. As shown in FIG. 5, when so formed the insulative member 20 has an outside diameter which is slightly smaller than the inside diameter of the base 1. When so dimensioned, insulative member 20 can be easily slid into and out of the base 1 as desired. Further, when the insulative member 20 is within the base 1, its cylindrical shape will be automatically retained without a separate means for holding the edges 25 and 26 together.

To prevent heat from escaping through the top of the device, insulative cap 25 can be placed over the insulative member 20. The cap 25 has a top surface 26, a bottom surface 27 and a side surface 28. The cap 25 is dimensioned so that is diameter is the same as the outside diameter of member 20. When so dimensioned, the cap can be easily placed within or removed from base 1 and can be fully supported near its side surface 28 by top edge 23 of insulative member 20.

In the preferred embodiment, both the insulative member 20 and insulative cap 25 (which is different from lid 5) are both made of a corrugated paper product such as cardboard. Such materials ae relatively inexpensive and generally provide sufficient insulative qualities for preventing frost damage to plants.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. A plant protector comprising:
   (a) a cylindrical base made of a colored transparent material;
   (b) means for retaining the base in a cylindrical shape around a plant;
   (c) a generally circular lid having a top, a rim extending downwardly from the top, and at least one hole through the top;
   (d) a cylindrical insulative member lining the interior of said cylindrical base for surrounding the plant to be protected; and
   (e) an insulative cap having a top surface, a bottom surface and a side surface, said insulative cap being dimensioned so that it can be received within said cylindrical base and supported by said insulative member at a location above said plant.

2. The apparatus of claim 1 wherein said insulative cap is constructed of the same material as said insulative member.

* * * * *